J. B. SLAWSON.

Car Lamp.

No. 70,635.

Patented Nov. 5, 1867.

WITNESSES:
Theo Grische
Wm Freum

INVENTOR:
Jno B Slawson
Per Munn &Co
Attorneys

United States Patent Office.

JOHN B. SLAWSON, OF NEW ORLEANS, LOUISIANA.

Letters Patent No. 70,635, dated November 5, 1867.

IMPROVEMENT IN LAMPS.

*The Schedule referred to in these Letters Patent and making part of the same.*

TO ALL WHOM IT MAY CONCERN:

Be it known that I, JOHN B. SLAWSON, of the city of New Orleans, parish of Orleans, and State of Louisiana, (at present residing in the city of New York,) have invented a new and improved Lamp for Car and Omnibus Fare-Box; and I do hereby declare that the following is a full, clear, and exact description thereof, which will enable others skilled in the art to make and use the same, reference being had to the accompanying drawings, forming a part of this specification, in which—

Similar letters of reference indicate corresponding parts.

This invention relates to a new mode of arranging the lamps which are provided in omnibus or car fare-boxes.

The object of the invention is to so place the light in a box that it will not blind the driver's eyes, and that it will illuminate the trap upon which the money falls when thrown in by the passengers.

The object of the invention is also to adapt the lamp to fare-boxes already in use, so that the box need not be changed.

The invention consists in arranging the burner in or near to one corner of the box, close to the driver's glass, so that the light will not be in the centre of the box, as usual, and will therefore not prevent the driver from seeing the money.

The invention also consists in the use of a reflector, which is so formed that the rays of the light will be thrown upon the money-trap into the car or omnibus towards the passengers, but which reflector also allows some light to fall towards the driver, just enough not to blind him, and to enable him to count the change, &c.

Heretofore the burners in such fare-boxes were arranged in the centre of the box, close to the front glass of the same, and the light did then not only blind the driver's eyes, but was in the way, and prevented him from seeing the money on the trap.

Figure 1:
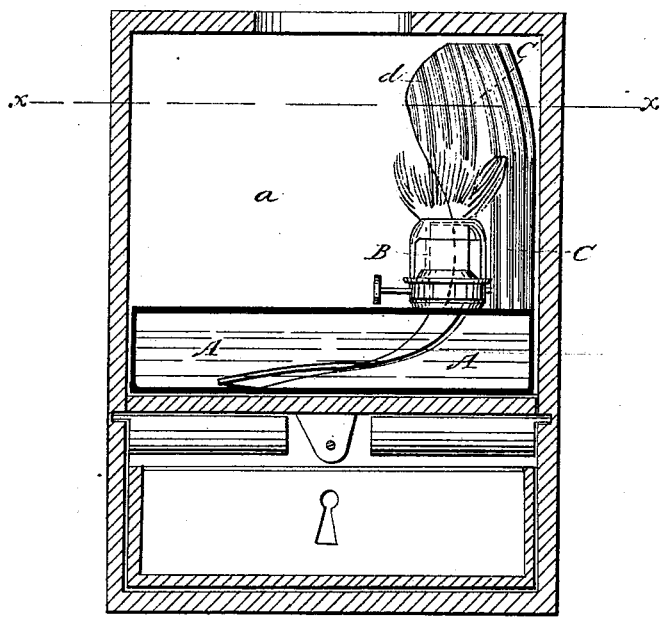
Figure 1 represents a side view, partly in section, of my improved lamp.
Figure 2:
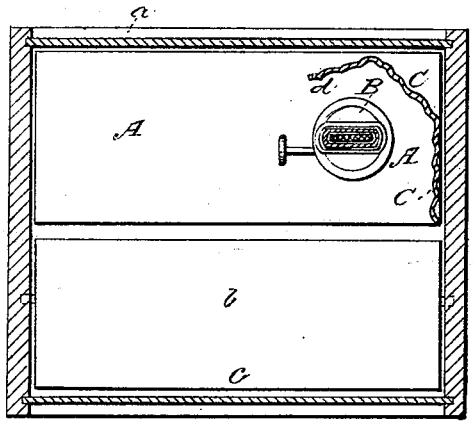
Figure 2 is a horizontal sectional view of the same, the plane of section being indicated by the line $x\,x$, fig. 1.

A represents a reservoir, made of sheet metal or other suitable material, in any suitable manner. It is to be placed into a fare-box of suitable construction, as indicated by red lines in fig. 2, near to the front or driver's light $a$. B is the burner, fitted upon the reservoir, near to one end of the same, so that when the reservoir is placed against the front of the box, the light will be in or near to one corner of the same, as is clearly shown by red lines in fig. 2. The burner may be of any suitable construction, and can be attached to the reservoir in any suitable manner. C is a reflector, made of sheet metal, and arranged either stationary on the fare-box or attached to the reservoir. It is so placed into that corner of the fare-box in which the light is held that it will throw the light towards and upon the money-trap $b$, and towards the passenger-pane $c$, as seen in fig. 2. The light is not wholly covered by the reflector on the front, so as to allow the driver to see and count change, &c., but a lip, $d$, is formed on the upper part of the reflector, in front of and above the light, so as to keep the light away from the eyes of the driver to prevent him from being blinded. The shape of the reflector is shown in figs. 1 and 2.

What I claim as new, and desire to secure by Letters Patent, is—

1. Arranging the burner B at or near the end of the reservoir A, substantially as and for the purpose herein shown and described.

2. Arranging a reflector, C, at or near the corner of the reservoir, the said reflector being made substantially as herein shown and described.

3. A lamp, A, when provided with a burner, B, which is arranged at or near to its end, so that it will be at or near one corner of the fare-box, in combination with the reflector C, which is made and arranged substantially as and for the purpose herein shown and described.

J. B. SLAWSON.

Witnesses:
ALEX. F. ROBERTS,
J. W. B. COVINGTON.